Patented Oct. 23, 1934

1,978,320

UNITED STATES PATENT OFFICE 1,978,320

METHOD FOR PRODUCING STABILIZED MIXTURE OF SPIRIT AND WATER

François Musset, Cognac, France

No Drawing. Application December 15, 1933, Serial No. 702,607. In France October 3, 1933

1 Claim. (Cl. 99—11)

Many spirits, such as brandy, whisky and the like may be consumed with the admixture of ordinary or sparkling water. This mixture is made by the consumer when drinking.

It has been impossible heretofore to provide the consumers with bottled prepared mixtures of this kind. It is well known in effect that if ordinary water is added to a spirit such as brandy so as to reduce the alcoholic degree to a value underneath 30 to 40, there arises after a very short time a lack of clearness which would prevent the sale of the mixture thus prepared. If distilled water has been used, the lack of clearness would arise more slowly but in a no less unavoidable manner.

Mixtures of spirits and sparkling water also become opaque when abandoned to the action of air.

Lastly for different reasons, it is impossible to add to the mixture of water and spirit any foreign matter because such foreign matter would always act in a detrimental manner on the delicacy of taste and would hinder the legal analysis to which certain spirits such as brandy chiefly those known under the name of Cognac and Armagnac are submitted. By reason of the deposit caused by the foreign matter the mixture loses certain necessary elements without even considering the case of the foreign matter bringing new elements into the mixture.

The present invention has chiefly for its object a method of stabilizing mixtures of spirit with water. It consists in introducing under pressure in bottles or the like receivers containing the spirit to be diluted, distilled water charged with carbon dioxide which has passed through a purifier, after which the stopping or corking is effected under pressure. Under these conditions, the mixture remains perfectly clear during a practically unlimited time whatever the degree of dilution may be and it may be sold commercially.

For purifying the carbon dioxide, it is of particular advantage to make the gas, as it advances through the purifier, pass through the liquid with which it is to remain in contact, i. e. the spirit which has been poured in the bottles or like receivers. It is apparent that the impurities in the carbon dioxide which are liable to spoil the spirit will thus be absorbed and there is no risk of their passing into the spirit intended for use. This is the case in particular for the ferruginous impurities.

The filling is performed with the usual machines which serve for the filling under pressure of the bottles of lemonade or sparkling water, say e. g. under a pressure of about 2 to 3 atmospheres. This provides a filling protected against the action of air, which prevents any oxidation of the spirit. In fact the small amount of air which was originally present in the receiver is immediately expelled by the emulsion of carbon dioxide and sterilized water as it enters the receiver and this small amount of air can only be in contact with the spirit when the latter is still at a concentration at which it cannot be injured by the oxidizing action of the air.

It seems that it is possible to explain the manner of acting of the carbonic gas by admitting that it arrests the transformation which would tend to arise after a certain time through the contact of water, even distilled, with spirit in presence of air.

What I claim is:

A method for stabilizing mixtures of spirit and water consisting in causing carbon dioxide to pass through a preliminary mass of the spirit, charging distilled water with the carbon dioxide thus purified, introducing the distilled water thus charged into the main mass of spirit and bottling the mixture thus obtained under pressure.

FRANÇOIS MUSSET.